United States Patent Office 2,837,709
Patented June 3, 1958

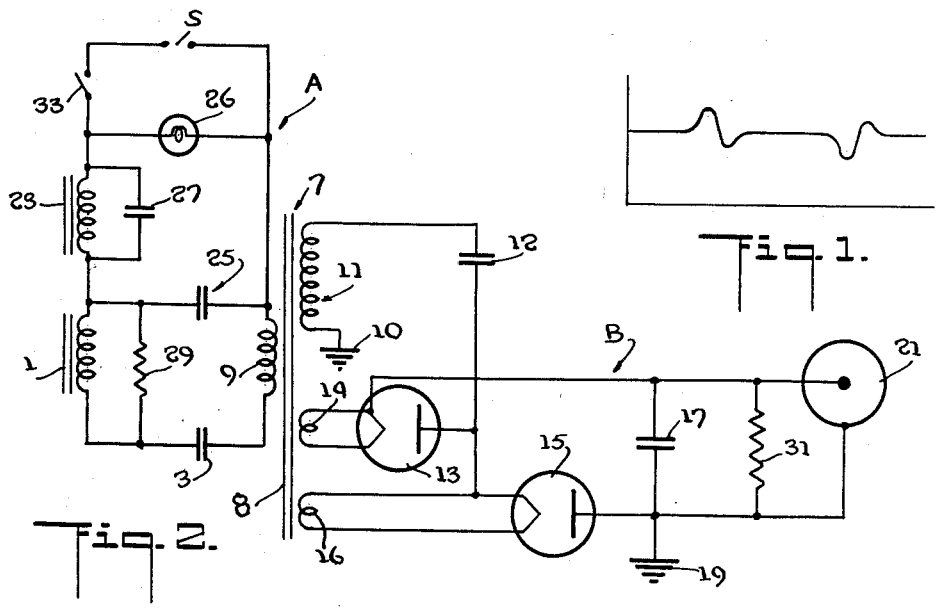
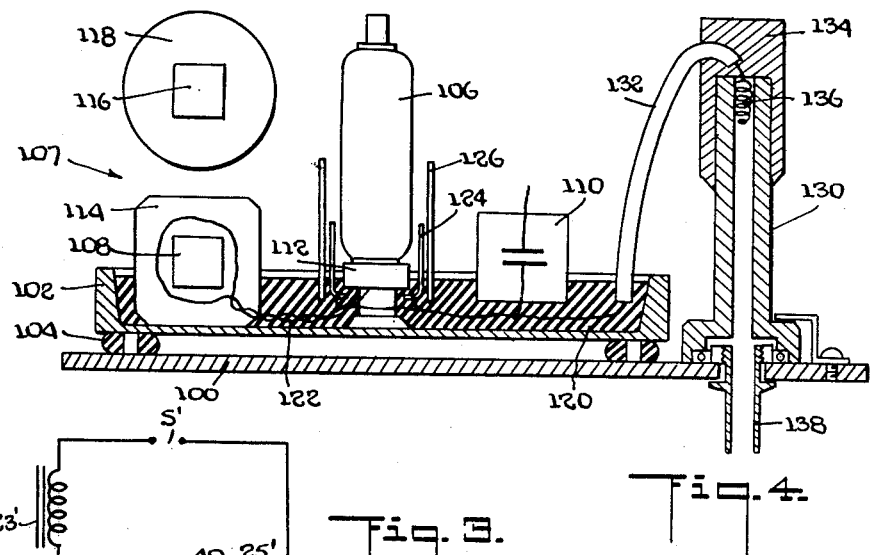
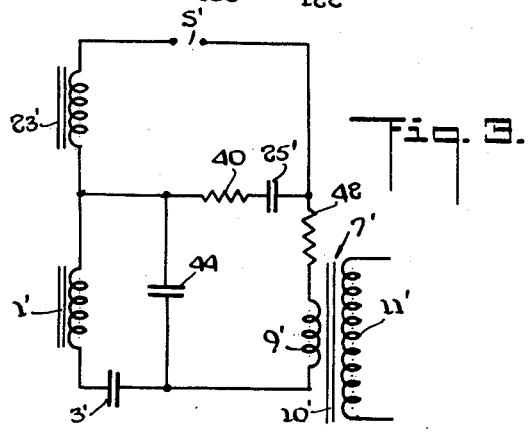
INVENTOR.
ARTHUR S. MILINOWSKI
BY William K Gluck
ATTORNEY

2,837,709

POWER SUPPLY

Arthur S. Milinowski, Peekskill, N. Y., assignor to Q-O-S Corporation, a corporation of New York Application December 21, 1953, Serial No. 399,319

8 Claims. (Cl. 321—25)

This invention relates to devices for providing current electric power at elevated voltages. More particularly, this invention relates to electric power supplies to supply direct current power to electron tubes, such as image convertors, radiation detectors, photomultipliers, etc. Such tubes operate from direct current potentials of from 500 to 20,000 volts. The present invention may be used to supply electric power to other instruments which require elevated voltages, such as resistance bridges, megohm meters, insulation testers, etc., but is not to be considered limited thereto.

The above instruments are used mainly with an external power source, such as the conventional 60 cycle, 115 volt line and it will be apparent that the performance of these instruments will depend, to some extent, on any variations or irregularities which may be present in the external source. In addition, while using the above instruments, precautions must be taken to prevent failure due to insulation breakdown, sparkover, corona, and other defects. In addition, many of the instruments with which this power supply is to be used will be under adverse conditions of weather, vibration, shocks and possible mishandling.

One object of the present invention is to produce a power supply unit wherein the output voltage will remain substantially stable regardless of any irregularities in the external source.

Another object of the invention is to provide a power supply unit which will have the reliability and ruggedness to operate efficiently under adverse conditions, such as those described above.

The accompanying drawings illustrate the preferred form of my invention. In the drawings:

Fig. 1 is a graph showing the type of wave developed at one stage in the circuit of Fig. 2;

Fig. 2 is a schematic diagrammatic view showing one embodiment of the circuit which is used with my invention;

Fig. 3 is a schematic diagrammatic view showing a second embodiment of the circuit which is used with my invention; and Fig. 4 is a plan view, partly in section, showing the elements of the power supply unit assembled in accordance with my invention.

The circuit used with this invention comprises two circuits A and B in circuit with the primary 9 and the secondary 11, respectively, of the step-up transformer 7. Circuit A is comprised of two saturable inductors 1 and 23 in series with each other and being fed by the external power source S. Capacitor 25 is in series with the inductor 23 and capacitor 3 is in series with the inductor 1. Switch 33 may be inserted in the circuit A and the pilot light 26 will indicate when the circuit A is closed.

Circuit B grounded at 10 and 19 comprises two rectifiers 13 and 15 and the capacitors 12 and 17. The well or output insulator 21 will supply power to an instrument (not shown). In the embodiment shown, the rectifiers 13 and 15 have filaments which are heated by separate windings, 14 and 16, respectively, on the transformer 7.

The invention operates in the following manner: Upon closing switch 33, an initial current surge is formed every half cycle of the voltage supply by saturation of the inductor 23, which receives its power from the source S, and charges the capacitor 25. Then, the inductor 1 becomes saturated, resulting in a current surge through primary 9, this current surge is augmented by a reverse current from the capacitor 25. The capacitor 3 acts to limit the duration of the pulse, which would otherwise continue and result in saturation of the transformer core 8. The resulting wave is an accentuated "peaked" wave, as seen in Fig. 1. The voltage will then be elevated by the transformer 7 and will pass through circuit B wherein it will be acted on by rectifiers 13 and 15 in a manner to be hereinafter described and passed out of the output 21 to an instrument (not shown). The operation of the rectifiers 13 and 15 is as follows: The output of transformer secondary 11 has a voltage excursion of say, for example, positive 10,000 volts on one-half of the cycle and negative 10,000 volts on the other half of the cycle. Thus the transformer secondary 11 acts, in conjunction with the rectifier 15 to accumulate a charge of 10,000 volts constant potential across the condenser 12, the positive polarity being on the side toward the rectifiers 13 and 15. The connection between condenser 3 and the rectifiers 13 and 15 now has an excursion of the original impulse from secondary 11 plus the constant of 10,000 of the condenser 12, so that the excursion of the above-mentioned connection is now from 0 to plus 20,000 volts. This 20,000 volts is accumulated as a fixed charge on condenser 17 by the rectifying action of the rectifier 2.

The "peaking" of the voltage wave will result in a great diminution of weight of the core 8 of transformer 7 and also will greatly diminish the number of turns in the secondary 11 required to "step-up" the voltage over that of a like transformer designed to operate on a sine wave of the same frequency. Hence the size and weight of the unit will be compact and cheaper to make.

To control the voltage stability of the rectified output, control means may be placed parallel with the primary 9 of transformer 7. Such control means may be a resistor 29. The resistor 29 shown in the drawings is nonlinear so as to be "voltage sensitive" and is of a special type wherein the resistance varies inversely with a power of the applied voltage. The resistor 29 will tend to compensate for the line voltage variations, so that it absorbs more power at the expense of the primary 9. A resistor 31 of a similar type presented in parallel with the output of the power supply may of itself serve a purpose similar to that of resistor 29.

A somewhat similar stabilizing influence can be obtained by the capacitor 27 located to shunt inductor 23. This will shift the position of the peaked wave in the alternating current cycle.

A second modification of circuit A is shown in Fig. 3. The power source S', inductors 23' and 1' and capacitors 3' and 25', are in circuit, with the primary 9' of the transformer 7', as before. A resistance 40 and a resistor 42 are in series with the inductor 23' and a capacitor 44 is parallel to the transformer 7. The operation is as follows: a portion of the initial surge is fed to the primary 9' through the capacitor 44 so that under conditions of abnormally high line voltage a different condition of primary transformer core flux exists at the initiation of the full pulse, thus tending to reduce the output voltage slightly from that obtained at normal input voltage. By adjusting the resistor 42, the desired value of output voltage can be adjusted to the proper input voltage range. The actual output voltage can be adjusted by the resistor 40, without altering the characteristics of the voltage regulation.

The circuit shown in Figs. 2 and 3 may be assembled as shown in Fig. 4. The cover 100 has mounted thereon the tray 102 and is removably mounted on a casing (not shown). The shock absorbers 104 are interposed between the cover 100 and the tray 102. The tray 102 contains the rectifier tube 106, the transformer 107, and a capacitor 110. The rectifier tube 106 is mounted on tray 102 by means of the socket 112, which is secured to the tray 102. The secondary 108 is surrounded by a plastic imbedment 114 and the primary 116 is surrounded by a plastic imbedment 118.

A dielectric substance 120 is poured into the tray 102 thus imbeding the elements and their leads 122. Preferably, the dielectric 120 is poured so that it does not go over the socket 112. Thus the tube 106 can be replaced without destroying the unit. The socket 112 is surrounded by a cylindrical, cup-shaped shield 124 which is connected to the leads 122 and the shield 124 is surrounded by the insulating tube 126.

The output insulator 130 is used to insulate leads going to an instrument (not shown). The insulator 130 is connected to the leads 122 and has the insulation 132 to insulate the exposed portion of lead 122. This insulator 130 has the air pressure seal 134 at one end and the spring 136 for effectively making contact with a connector. The gasket 138 is provided at its other end to make an airtight seal with the cover 100.

It will be seen from the above, that my invention will provide a power supply which will be reliable and rugged, which will be more compact and easier to handle, and which will produce a substantially stable output voltage.

I claim:

1. A power supplying device for voltage regulation of alternating current from a source of alternating current supply, comprised of a transformer, a circuit in and confined to a circuit with the primary of said transformer and a circuit in and confined to a circuit with the secondary of said transformer, said first-mentioned circuit being comprised of a first inductor, a first capacitor in series therewith, a second inductor in series with said first inductor, and a second capacitor in series with said second inductor, said first inductor being connected to the source of alternating current supply to receive a saturating current surge therefrom and charging the first capacitor and producing a current surge to and saturation of the second said inductor and a pulse surge to said transformer primary, said first capacitor augmenting said pulse surge to the transformer primary by reverse current and the second said capacitor limiting duration of said pulse to said transformer primary.

2. A device as set forth in claim 1, wherein a resistor is in parallel to said first-mentioned inductor.

3. A device as set forth in claim 2, wherein said resistor is of a type wherein the resistance varies inversely with a power of the voltage.

4. A device as set forth in claim 1, wherein two rectifiers are in said second-mentioned circuit and wherein said second-mentioned circuit provides an output and a resistance is provided in shunt with said output.

5. A device as set forth in claim 1, wherein a capacitor is provided in parallel to said second-mentioned inductor.

6. A device as set forth in claim 1, wherein a capacitor is provided in parallel to said first-mentioned inductor.

7. A circuit as set forth in claim 6, wherein a resistor is provided in series with said second-mentioned inductor.

8. A circuit as set forth in claim 7, wherein a resistor is provided in series with said first-mentioned resistor.

References Cited in the file of this patent

UNITED STATES PATENTS

| Re. 20,317 | Suits | Mar. 30, 1937 |
|---|---|---|
| 1,802,563 | Kuhn et al. | Apr. 28, 1931 |
| 1,993,914 | Bohm | Mar. 12, 1935 |
| 2,046,952 | Kaufmann | July 7, 1936 |
| 2,236,254 | Willis | Mar. 25, 1941 |
| 2,377,180 | Pohm | May 29, 1945 |
| 2,420,311 | Gowell | May 13, 1947 |
| 2,467,753 | Kirschbaum | Apr. 19, 1949 |
| 2,473,617 | Stiefel | June 21, 1949 |
| 2,590,821 | Kiser | Mar. 25, 1952 |
| 2,738,444 | Casey | Mar. 13, 1956 |
| 2,738,466 | Niederman | Mar. 13, 1956 |

OTHER REFERENCES

Cuming: "Plastic embedded circuits," Electronics, June 1950, pp. 66–69.